(12) United States Patent
Hayashi et al.

(10) Patent No.: US 8,465,048 B2
(45) Date of Patent: Jun. 18, 2013

(54) AIRBAG COVER

(75) Inventors: Mikine Hayashi, Kiyosu (JP); Hitoshi Iida, Kiyosu (JP)

(73) Assignee: Toyoda Gosei Co., Ltd., Aichi-Pref. (JP)

( * ) Notice: Subject to any disclaimer, the term of this patent is extended or adjusted under 35 U.S.C. 154(b) by 16 days.

(21) Appl. No.: 13/329,586

(22) Filed: Dec. 19, 2011

(65) Prior Publication Data

US 2012/0242065 A1     Sep. 27, 2012

(30) Foreign Application Priority Data

Mar. 25, 2011  (JP) ................... 2011-068105

(51) Int. Cl.
*B60R 21/215*     (2011.01)
*B60R 21/203*     (2006.01)

(52) U.S. Cl.
USPC ....................... 280/728.3; 280/731

(58) Field of Classification Search
CPC .... B60R 21/203; B60R 21/215; B60R 21/2155
USPC .............................. 280/728.3, 731
See application file for complete search history.

(56) References Cited

U.S. PATENT DOCUMENTS

| | | | |
|---|---|---|---|
| 5,499,842 A * | 3/1996 | Yamamoto et al. ......... | 280/728.3 |
| 6,443,483 B2 * | 9/2002 | Ellerbrok ................... | 280/728.3 |
| 7,766,371 B2 * | 8/2010 | Fujimori et al. ............ | 280/728.3 |
| 7,775,550 B2 * | 8/2010 | Dominguez Aparicio et al. ........................ | 280/728.3 |
| 8,267,422 B2 * | 9/2012 | Sauer et al. ................ | 280/728.3 |
| 2003/0209889 A1 * | 11/2003 | Erwin et al. ............... | 280/728.3 |
| 2006/0186646 A1 * | 8/2006 | Bauer et al. ................ | 280/728.3 |

FOREIGN PATENT DOCUMENTS

| | | |
|---|---|---|
| JP | U-1-81351 | 5/1989 |
| JP | A-2008-308141 | 12/2008 |

* cited by examiner

*Primary Examiner* — Joseph Rocca
(74) *Attorney, Agent, or Firm* — Posz Law Group, PLC

(57) ABSTRACT

An airbag cover including a front door located in a front area of the airbag cover so as to be openable forward and an ornament located on a top face of the front door. The front door includes a mounting section for mounting the ornament thereon, and the mounting section partially protrudes rearward from the rear edge of the front door. The front door further includes an auxiliary breakable portion that is located at the front edge of the mounting section so as to be breakable when an obstacle contacts with the ornament, and a pair of second hinges located at left and right ends of the auxiliary breakable portion. The mounting section bends about the second hinges relative to the front door in an opposite direction to an opening direction of the front door at breakage of the auxiliary breakable portion.

5 Claims, 9 Drawing Sheets

AIRBAG COVER

CROSS REFERENCE TO RELATED APPLICATIONS

The Present application claims priority from Japanese Patent Application No. 2011-068105 of Hayashi et al., filed on Mar. 25, 2011, the disclosure of which is hereby incorporated into the present application by reference.

BACKGROUND OF THE INVENTION

1. Field of the Invention

The present invention relates to an airbag cover which is made from synthetic resin for covering a folded-up airbag of an airbag apparatus for a steering wheel, and includes a door openable at airbag deployment and an ornament located on a top face of the door.

2. Description of Related Art

JP 1-81351 U discloses an airbag cover provided with an ornament on a top face of a door section for allowing airbag emergence. The airbag cover includes a front door that opens forward in such a manner as to turn the rear edge forward, as a part of the door section. The ornament is mounted on a mounting section located generally at the center in a left and right direction of the rear edge of the front door, in such a manner as to protrude rearward partially.

JP 2008-308141 discloses an airbag cover wherein an ornament is located in a vicinity of the rear edge of a front door in such a manner as to protrude slightly rearward from the rear edge. The ornament is so arranged as to protrude partially from the top face of the front door.

With the airbag covers disclosed in the above references, the configuration of the ornament that protrudes rearward from the rear edge of the front door increases a radius of rotation of the front door, i.e., a distance between a hinge section located at the front edge of the front door and the rear edge of the ornament. This may hinder opening of the front door in the event that such an obstacle as a head of a driver engages with the front door during opening, especially when the head is in proximity to the airbag cover.

SUMMARY OF THE INVENTION

An object of the present invention is to provide an airbag cover capable of opening a front door with an ornament quickly even though such an obstacle as a driver's head is in proximity thereto.

The object of the invention will be achieved by a following airbag cover:

The airbag cover is made from synthetic resin for covering a folded-up airbag of an airbag apparatus for a steering wheel. The airbag cover includes:
  a door section that is openable when pushed by the airbag at deployment, the door section including at least two doors;
  a front door that is located in a front area of the airbag cover covering the airbag as part of the door section and openable forward;
  an ornament located on a top face of the front door;
  a first hinge that is located at a front edge of the front door so as to allow the front door to open there around such that a rear edge of the front door turns forward;
  a mounting section for mounting the ornament thereon, the mounting section being located generally at a center in a left and right direction of the rear edge of the front door and partially protruding rearward from the rear edge of the front door;
  a breakable portion that is located at the rear edge of the front door and extends generally in a left and right direction in such a manner as to circumvent the mounting section;
  an auxiliary breakable portion that is located at a front edge of the mounting section and extends generally along the ornament, the auxiliary breakable portion being thinner than the front door and breakable when an obstacle contacts with the ornament during opening of the front door; and
  a pair of second hinges located at left and right ends of the auxiliary breakable portion and between the auxiliary breakable portion and the breakable portion, whereby allowing the mounting section to bend about the second hinges relative to the front door in an opposite direction to an opening direction of the front door at breakage of the auxiliary breakable portion.

With the airbag cover of the invention, in the event that an ornament located on the front door engages with such an obstacle as a head of a driver in proximity thereto while the front door opens, the auxiliary breakable portion arranged along the front edge of the mounting section of the ornament will break and allow the mounting section to rotate in an opposite direction to the opening direction of the front door about the second hinges located at the opposite terminals of the auxiliary breakable portion and bend relative to the front door. That is, although the ornament or its mounting section protrudes rearward from the center in a left and right direction of the rear edge of the front door, the mounting section bends around the second hinges in the opposite direction to the opening direction of the front door at hitting the obstacle, due to breakage of the auxiliary breakable portion. This will reduce a substantial radius of rotation of the front door from the hinge to the leading end, thereby enabling the front door to open smoothly while preventing a further contact between the ornament and the obstacle. As a result, although the ornament is so formed as to protrude partially from the top face of the front door, the front door will open smoothly and quickly by allowing the ornament to avoid the obstacle and move along the opening of the front door.

Therefore, the airbag cover of the present invention is capable of opening the front door with an ornament quickly even though a driver's head or the like is in proximity thereto.

The airbag cover described above desirably includes in a vicinity of a border of the auxiliary breakable portion and the second hinges a pair of thick portions that is thicker than the second hinges. The thick portions will prevent the second hinges from breaking due to aftereffects of breakage of the auxiliary breakable portion and consequently prevent the mounting section from being separated from the front door.

Further, if the auxiliary breakable portion is formed by denting a top face of the mounting section along and adjoining the ornament, the auxiliary breakable portion will be unnoticeable and therefore conducive to improve the appearance of the airbag cover.

The ornament of the airbag cover of can be either that mounted on and integrated with the mounting section of the front door by film insert molding at manufacturing of the airbag cover or that originally prepared separate from the airbag cover so as to be mountable on the mounting section.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
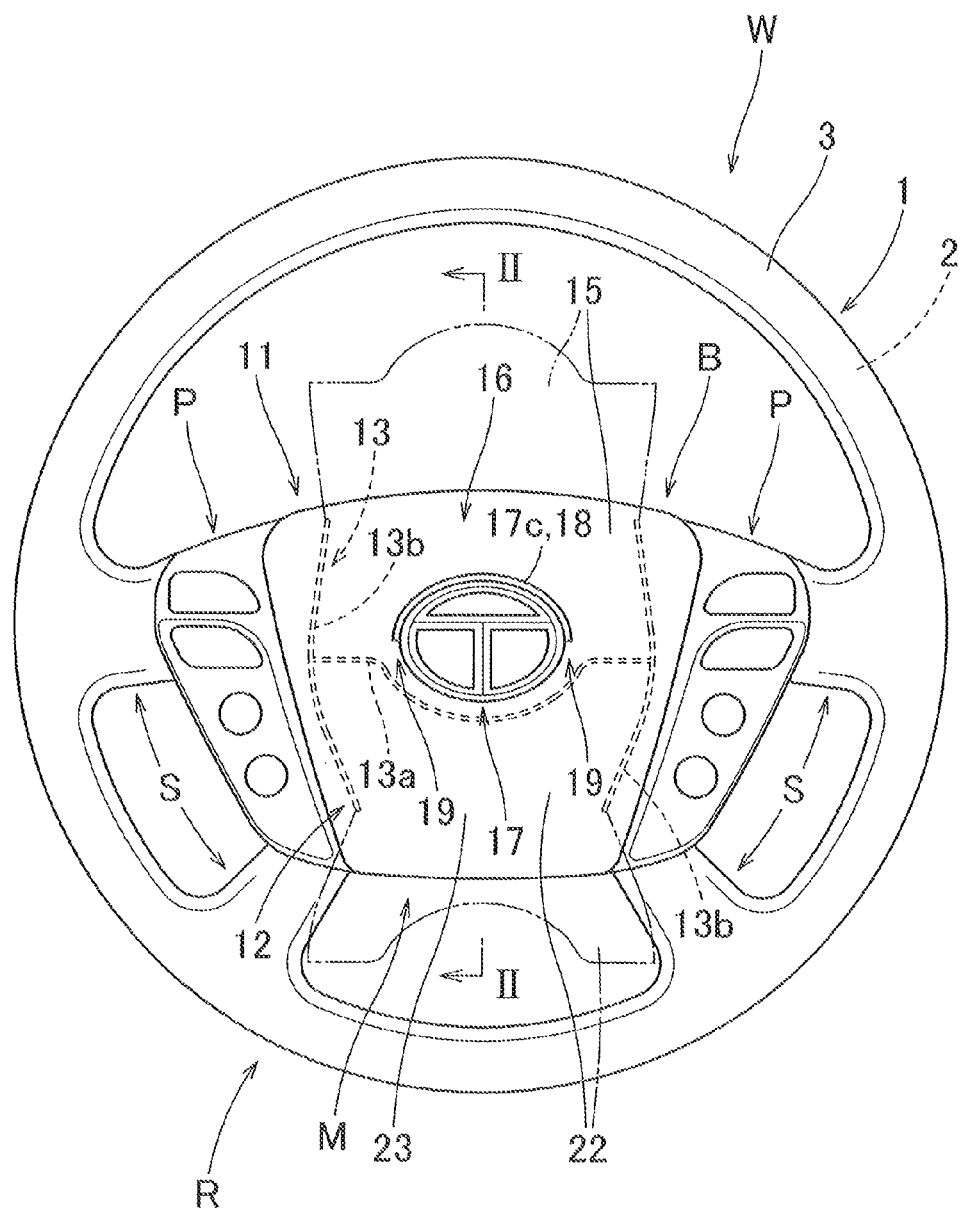
FIG. 1 is a plan view of a steering wheel on which an airbag cover embodying the invention is mounted.
Figure 2:
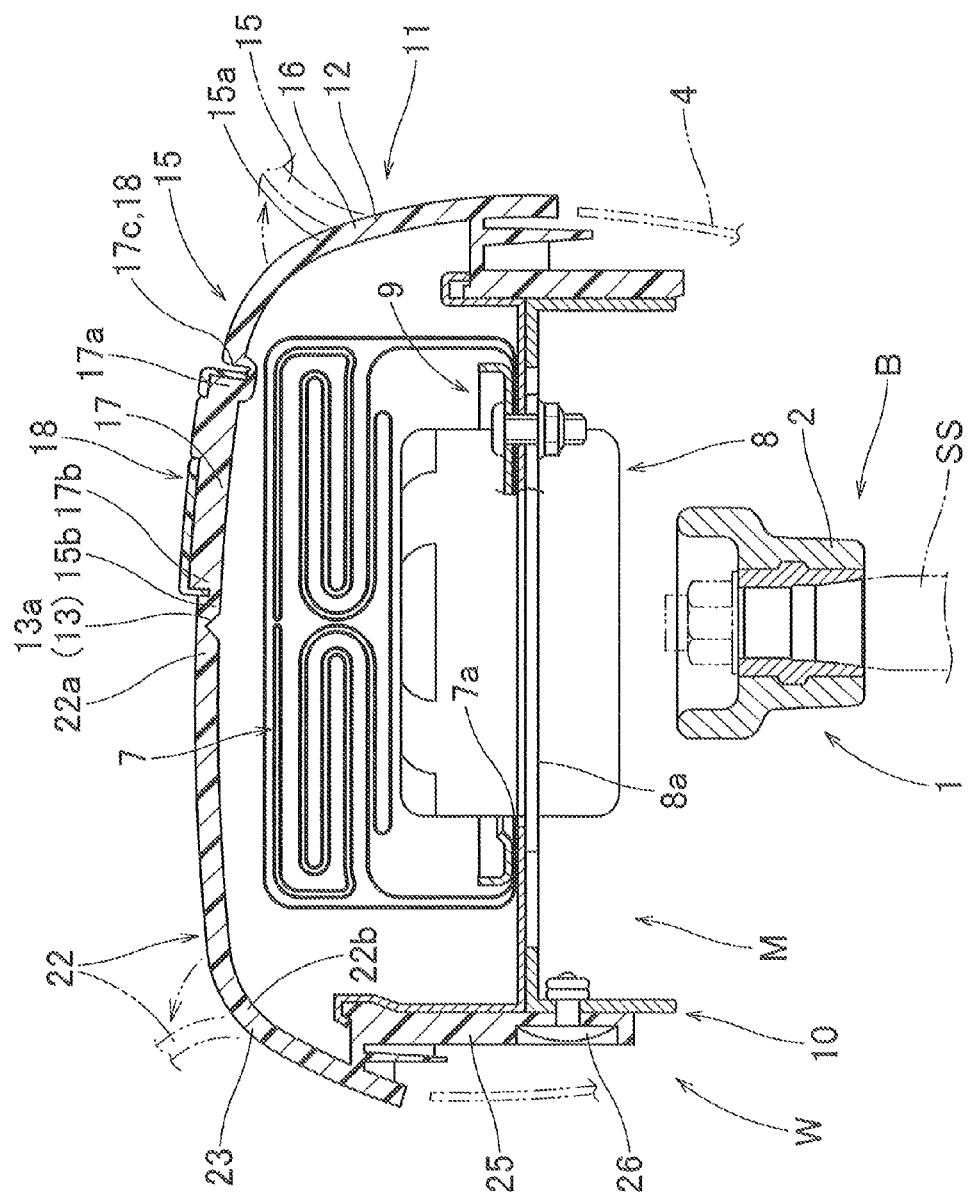
FIG. 2 is a schematic sectional view of the steering wheel of FIG. 1 taken along line II-II of FIG. 1.

As shown in FIGS. 1 and 2, an airbag cover embodying the invention is used in an airbag apparatus M for use in a steering wheel W. The steering wheel W includes a steering wheel body 1 and the airbag apparatus M. The steering wheel body 1 includes a generally annular ring section R to be hand held for steering a vehicle, a boss section B located generally at the center of the ring section R and a plurality of (four, in this embodiment) spokes S that connect the ring section R and boss section B. The airbag apparatus M is mounted above the boss section B. As shown in FIG. 1, control panels P are arranged on the left and right of the airbag apparatus M with various switches to be manipulated during driving.

Figure 7:
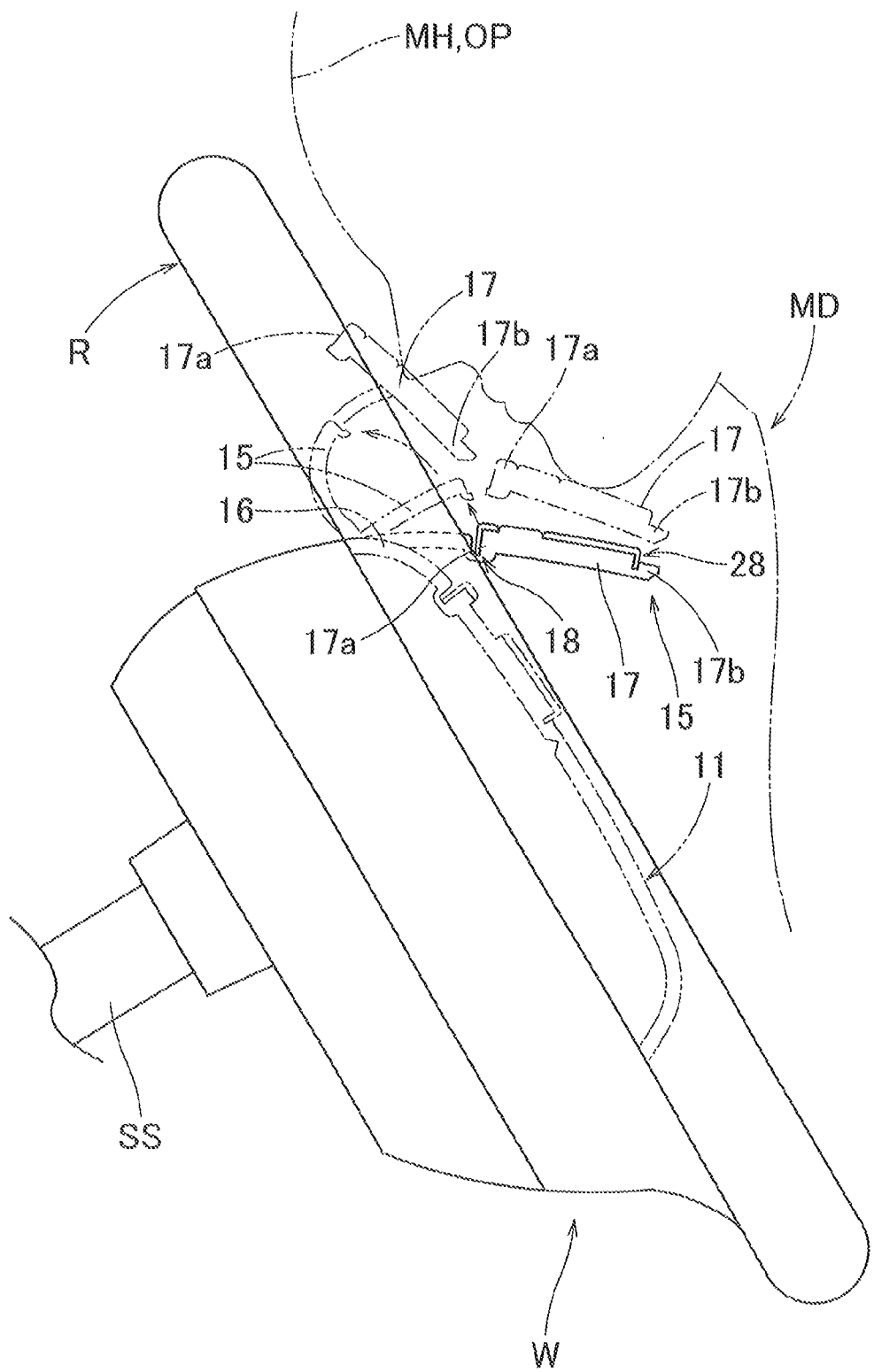
FIG. 7 schematically illustrates the way a door of the airbag cover opens when on board.

Unless otherwise specified, front/rear, up/down, and left/right in the embodiments are based on the steering wheel W mounted on a vehicle and steered straight ahead. Specifically, up/down is intended to refer to an up/down direction extending along an axial direction of a steering shaft (as shown in FIGS. 2 and 7) on which the steering wheel W is mounted. Front/rear is intended to refer to a front/rear direction of a vehicle extending orthogonal to the axial direction of the steering shaft, and left/right is intended to refer to a left/right direction of the vehicle extending orthogonal to the axial direction of the steering shaft.

As shown in FIGS. 1 and 2, the steering wheel body 1 includes a wheel core 2, a cladding layer 3 and a lower cover 4. The wheel core 2 has such a contour that the ring section R, the boss section B and the spokes S are interconnected. The cladding layer 3 is fabricated of such a synthetic resin as urethane and covers the core 2 at the ring section R and regions of the spokes S in the vicinity of the ring section R. The lower cover 4 is made from such a synthetic resin as polypropylene and covers an underside of the boss section B.

Referring to FIG. 2, the airbag apparatus M includes an airbag 7 which is housed in a folded state, an inflator 8 for supplying the airbag 7 with inflation gas, an airbag cover 11 covering the airbag 7 and a bag holder 10 which holds the airbag 7, inflator 8 and airbag cover 11. A member shown at 9 in FIG. 2 is a retainer that holds down a periphery of an opening 7a of the airbag 7 and attaches the airbag 7 and inflator 8 to the bag holder 10. The retainer 9 is provided with bolts (reference numeral omitted) projecting downward, and the bolts are put through the periphery of the opening 7a of the airbag 7, the bag holder 10 and a flange 8c of the inflator 8 and fastened with nuts, thereby securing the airbag 7 and inflator 8 to the bag holder 10. The airbag apparatus M is mounted on the steering wheel body 1 using an unillustrated horn switch mechanism and a connecting plate.

Figure 3:
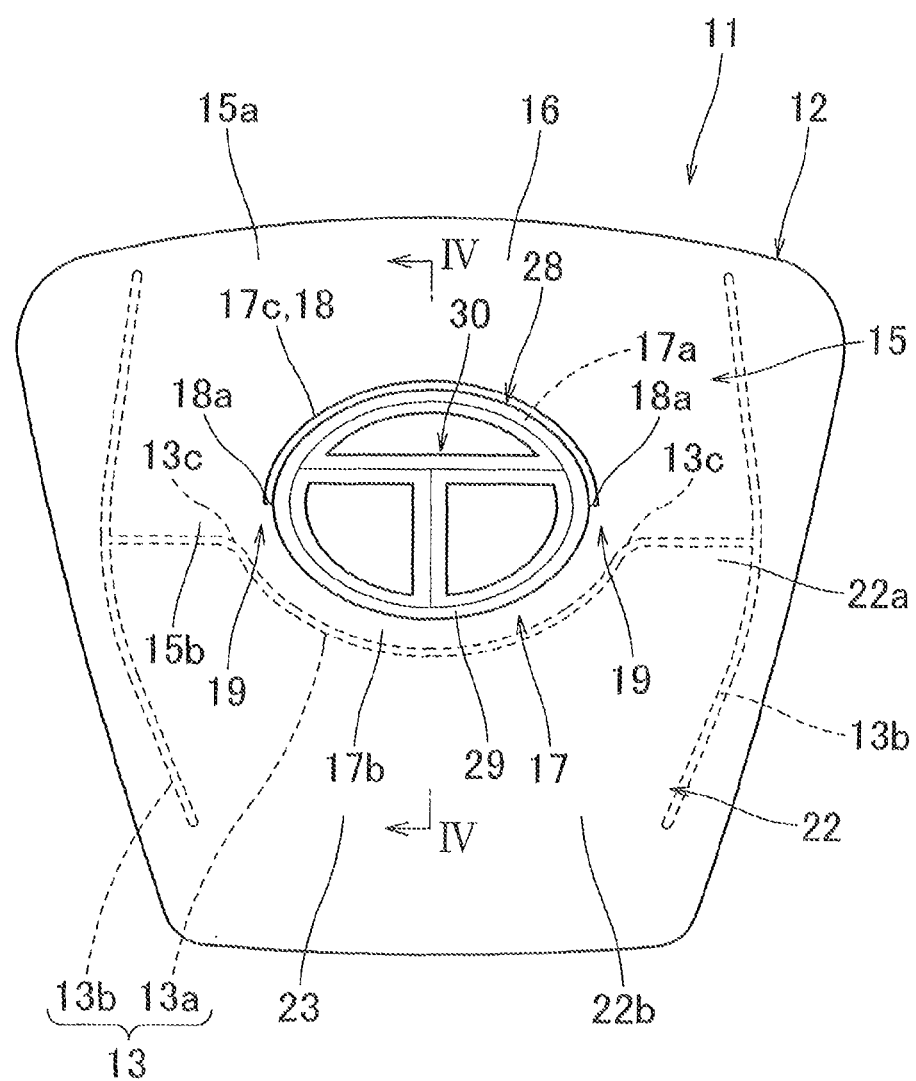
FIG. 3 is a plan view of the airbag cover.

Referring to FIGS. 2 and 3, the airbag cover 11 is fabricated of a thermoplastic elastomer such as olefin, styrene or the like, and includes a ceiling wall 12 covering the airbag 7 from above and a side wall 25 having a generally square tubular shape extending downward from the underside of the ceiling wall 12. The side wall 25 is coupled to the bag holder 10 with rivets 26, as shown in FIG. 2. The ceiling wall 12 includes two doors; a front door 15 and a rear door 22 which are arranged one in front of another and openable at deployment of the airbag 7. The front door 15 is openable forward and the rear door 22 is openable rearward. The front door 15 is located in a front region of the ceiling wall 12 which covers the airbag 7, and includes an ornament 28 on the top face.

Around the front door 15 and rear door 22 is a breakable portion 13 formed into a generally H shape as viewed from above. The breakable portion 13 includes a horizontal bar portion 13a extending generally along a left and right direction and a pair of vertical bar portions 13b extending generally along a front and rear direction by the side of the opposite ends of the horizontal bar portion 13a. When the breakable portion 13 breaks at airbag deployment, the front door 15 opens around a hinge 16 which is located at the front edge 15a where no breakable portion 13 is arranged so that the rear edge 15b turns forward whereas the rear door 22 opens around a hinge 23 which is located at the rear edge 22b where no breakable portion 13 is arranged such that the front edge 22a turns rearward (refer to double-dashed lines in FIG. 2). The front door 15 includes generally at the center in a left and right direction of the rear edge region 15b a mounting section 17 for the ornament 28. The mounting section 17 has a generally oval shape elongated in a left and right direction, which shape is generally identical to that of the ornament 28. The mounting section 17 partially protrudes rearward relative to the rear edge 15b of the front door 15. More specifically, the mounting section 17 protrudes partially rearward relative to the front door 15 at the center in a left and right direction of the rear edge. Accordingly, the horizontal bar portion 13a of the breakable portion 13 is so formed as to protrude rearward at the center in a left and right direction while curving in such a manner as to circumvent the mounting section 17 (FIGS. 1 and 3). In the illustrated embodiment, moreover, the thickness T1 of the horizontal bar portion 13a of the breakable portion 13 is about ¼ of the thickness T2 of the front door 15/rear door 22 (FIG. 4). Although not shown in the drawings, the thickness of the vertical bar portions 13b is generally equal to that of the horizontal bar portion 13 at the center in a front and rear direction, and gradually increases toward opposite ends in a front and rear direction.

Figure 4A:
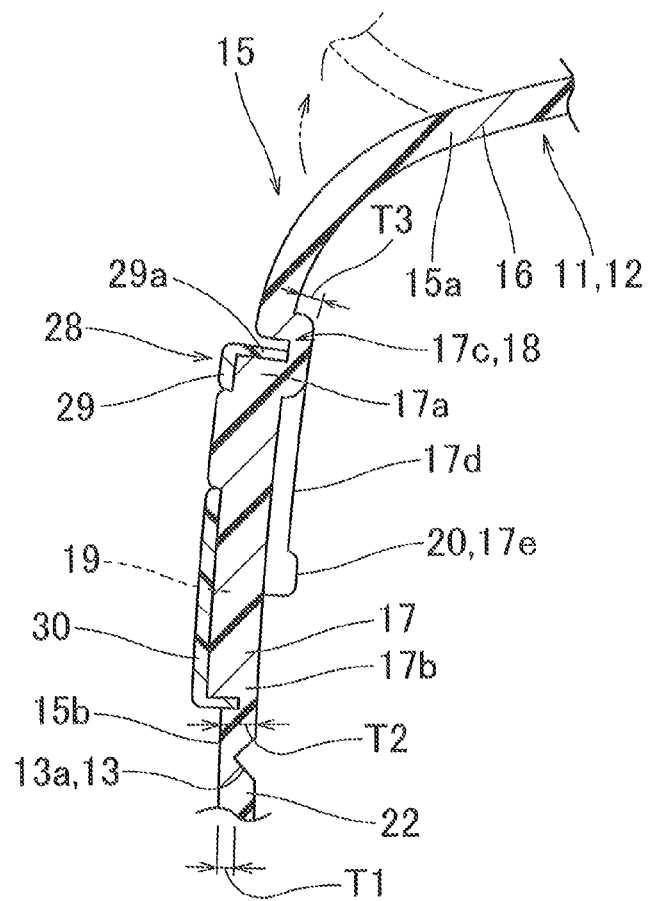
FIGS. 4A and 4B are partial enlarged sectional views of the airbag cover taken along line IV-IV of FIG. 3.

Referring to FIGS. 3 to 6, the front door 15 is provided, at the front edge 17a of the mounting section 17, with an auxiliary breakable portion 18 and a pair of second hinges 19 around which the mounting section 17 opens at breakage of the auxiliary breakable portion 18. The auxiliary breakable portion 18 is formed along an outer circumferential edge of the ornament 28 in such a manner as to adjoin the ornament 28. As shown in FIG. 4, the auxiliary breakable portion 18 is formed by denting the top face of the mounting section 17 in a continuous groove-like fashion along and adjoining a later-described flange 29a of the frame 29 of the ornament 28. In this specific embodiment, the auxiliary breakable portion 18 is formed along a generally entire front edge of the ornament 28 except left and right end regions of the ornament 28. That is, the auxiliary breakable portion 18 is formed into a generally half oval arc having opposite terminals 18a directed toward corners 13c of the horizontal bar portion 13a of the breakable portion 13. The thickness of the auxiliary breakable portion 18 is so determined as not to break at the same time as breakage of the breakable portion 13 at airbag deployment, but as to break when engaging with and pushed by an obstacle OP such as a head MH of a driver MD at opening of the front door 15. Specifically, the thickness T3 of the auxiliary breakable portion 18 is greater than the thickness T1 of the horizontal bar portion 13a of the breakable portion 13 and is about ½ to ⅓ of the thickness T2 of the front door 15, as shown in FIG. 4A.

Figure 6:
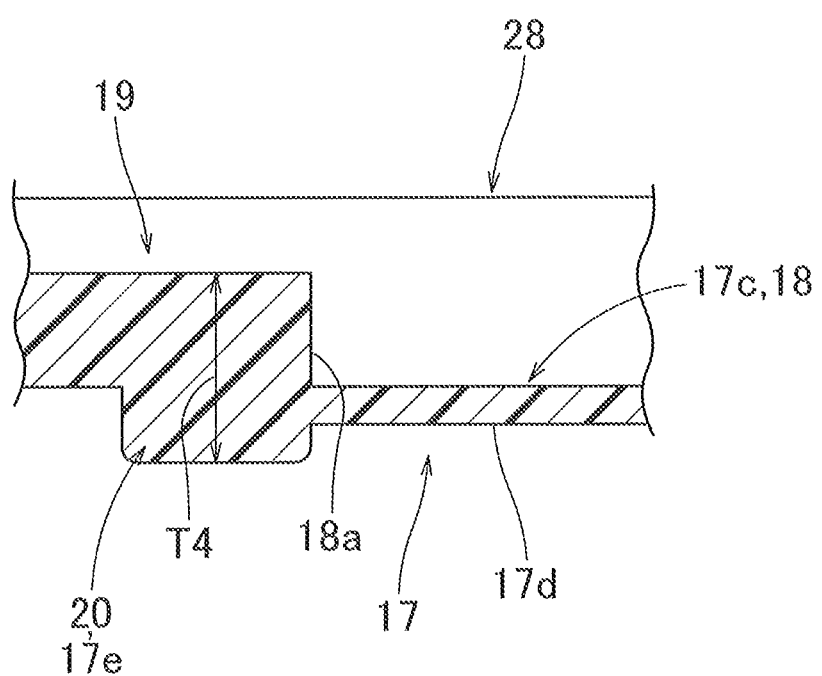
FIG. 6 is a partial enlarged sectional view taken along line VI-VI of FIG. 5.

The second hinges 19 are located in a vicinity of each of the opposite ends of the auxiliary breakable portion 18 and between the auxiliary breakable portion 18 and horizontal bar portion 13a of the breakable portion 13. In other words, each of the second hinges 19 is comprised of a region between the auxiliary breakable portion 18 and horizontal bar portion 13a in left and right end regions of the mounting section 17. More specifically, as shown in FIG. 3, the second hinges 19 are comprised of regions between terminals 18a of the auxiliary breakable portion 18 and the corners 13c of the horizontal bar portion 13a. Each of the second hinges 19 is formed continuously from the front door 15 and has a generally same thickness as the front door 15. Each of the second hinges 19 has a thick portion 20 in a vicinity of a border with the auxiliary breakable portion 18. Each of the thick portions 20 is thicker than the front door 15 in such a manner that terminals 17e of a later-described raised section 17d, which forms a circumference of the auxiliary breakable portion 18, are extended further downward. In order to prevent the second hinges 19 from breaking due to aftereffects of breakage of the auxiliary breakable region 18, each of the thick portions 20 is wider than the auxiliary breakable region 18 (FIG. 5) and its thickness T4 is about 1.5 times as thick as the thickness T2 of the front door 15 (FIG. 6).

Figure 4B:
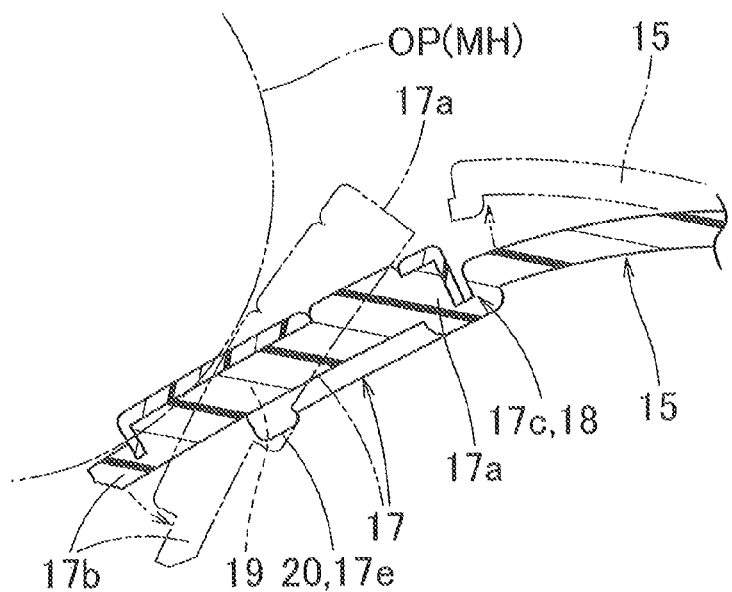
Figure 5:
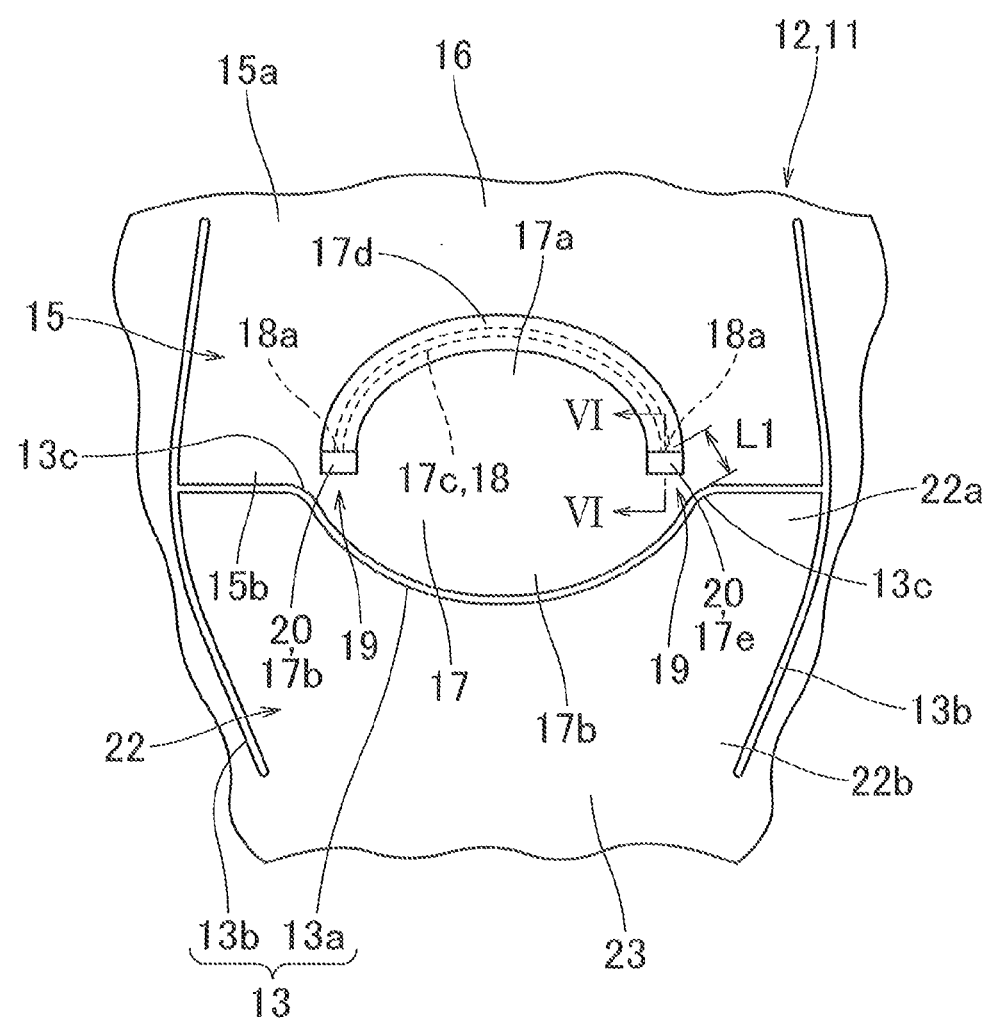
FIG. 5 is a partial enlarged bottom view of the airbag cover.

Upon breakage of the auxiliary breakable portion 18, the mounting section 17 bends about the second hinges 19 towards an opposite direction to the opening direction of the front door 15 while being pressed by the obstacle OP rearward and downward. More specifically, as shown in FIG. 4B, the mounting section 17 rotates around the second hinges 19 so the rear edge 17b turns downward relative to the front door 15. The distance L1 between each of the terminals 18a of the auxiliary breakable portion 18 and each of the corners 13c of the horizontal bar portion 13a (FIG. 5), i.e., the width of each of the second hinges 19, is such that allows the mounting section 17 to rotate there around easily after breakage of the auxiliary breakable portion 18.

The ornament 28, prepared separate from the airbag cover 11, is mounted on and integrated with the mounting section 17 of the front door 15 by film insert molding at manufacturing of the airbag cover 11. The ornament 28 is made of a film of such polypropylene, polyester resin as PET or the like, and includes a frame 29 which is formed into a generally oval ring elongated in a left and right direction and a main body 30 located inside the frame 29 and formed into a generally T shape. The ornament 28 protrudes partially from the top face of the front door 15. In the ornament 28 of this specific embodiment, referring to FIG. 4A, the frame 29 includes along the outer circumference a flange 29a projecting downward to be set in the mounting section 17, and the flange 29a is set in a groove 17c formed by denting the top face of the mounting section 17. A remaining space of the groove 17c forms the auxiliary breakable portion 18. That is, the groove 17c has a wide and deep section only in a front periphery of the mounting section 17, and thus providing the auxiliary breakable portion 18. In a rear periphery of the ornament 28 having no auxiliary breakable portion 18, the width of the groove 18c is so determined that the flange 29a fit therein tightly, leaving no interspace. The airbag cover 11 further includes along the auxiliary breakable portion 18 a raised section 17d that protrudes downward relative to the surround. The raised section 17d continuously surrounds the groove 17c in the front periphery of the mounting section 17. As shown in FIGS. 6 and 7, both terminals 17e of the raised section 17d are so formed as to cover the rear side of the terminals 18a of the auxiliary breakable portion 18 even more thickly and protrudes even more downward. These terminals 17e of the raised section 17d located at the rear of the terminals 18a of the auxiliary breakable portion 18 form thick portions 20.

The airbag apparatus M is assembled by mounting the airbag cover 11 provided with the ornament 28 in advance on the side wall 25 of the bag holder 10, which houses the airbag 7 and inflator 8, with rivets 26. Then the airbag apparatus M is mounted on an unillustrated mount of the steering wheel 1 on board with a horn switch mechanism and a connecting plate, thus completing the steering wheel W and mounting the steering wheel W on a vehicle.

After the steering wheel W is mounted on a vehicle, if the inflator 8 discharges an inflation gas to inflate the airbag 7, the airbag 7 will push up the ceiling wall 12 of the airbag cover 11 so the breakable portion 13 will break, and then the airbag 7 will emerge from an opening formed by opening of the front door 15 and rear door 22.

With the airbag cover 11, in the event that the ornament 28 located on the front door 15 engages with such an obstacle OP as a head MH of a driver MP in proximity thereto while the front door 15 opens, the auxiliary breakable portion 18 arranged along the front edge 17a of the mounting section 17 of the ornament 18 will break and allow the mounting section 17 to rotate in an opposite direction to the opening direction of the front door 15 about the second hinges 19 located at the opposite terminals of the auxiliary breakable portion 18 and bend relative to the front door 15. That is, although the ornament 28 or its mounting section 17 protrudes rearward from the center in a left and right direction of the rear edge 15b of the front door 15, the mounting section 17 bends around the second hinges 19 in the opposite direction to the opening direction of the front door 15 at hitting an obstacle OP, due to breakage of the auxiliary breakable portion 18. This will reduce a substantial radius of rotation of the front door 15 from the hinge 16 to the leading end, thereby enabling the front door 15 to open smoothly while preventing a further contact between the ornament 18 and obstacle OP.

Figure 8:
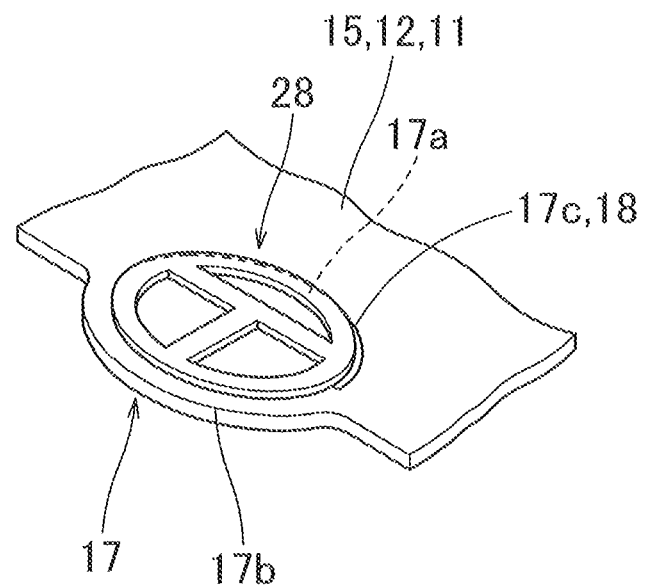
FIG. 8 schematically illustrates the way a mounting section of an ornament bends about second hinges relative to a front door upon breakage of an auxiliary breakable portion.
Figure 8:
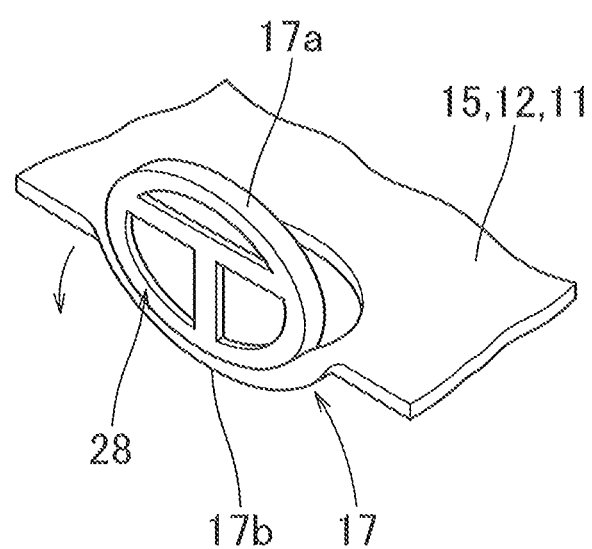

Referring to FIG. 7, more specifically, even if the front door 15 opens when a driver MD is in proximity to the steering wheel W with his forehead located close to the front region of the ring section R, when the mounting section 17 abuts against the chin or its vicinity of the driver MD as the front door 15 opens, the front door 15 will be once held from opening and the mounting section 17 will be depressed by the head MH or obstacle OP, thus the auxiliary breakable portion 18 will be broken. Then the mounting section 17 will bend about the second hinges 19 in an opposite direction to the opening direction of the front door 15 so the front edge 17a turns upward while the rear edge 17b turns downward, as shown in FIG. 8, and the front door 15 will further open with the mounting section 17 bent. The mounting section 17 thus bent will be arranged generally along the facial surface of the driver MD, and accordingly move forward as the door 15 further opens in such a manner as to slip through a space in front of the head MH, without pushing the head MH forcefully.

As a result, although the ornament 28 is so formed as to protrude partially from the top face of the front door 15, the front door 15 will open smoothly and quickly by allowing the ornament 28 to avoid the obstacle OP and move along with the opening of the front door 15.

Therefore, the airbag cover 11 of the foregoing embodiment is capable of opening the front door 15 with the ornament 28 quickly even though such an obstacle OP as a driver's head is in proximity thereto.

Moreover, the airbag cover 11 includes the thick portions 20 in a vicinity of the border of the auxiliary breakable portion 18 and the second hinges 19. The thick portions 20, which are thicker than the second hinges 19, will prevent the second hinges 19 from breaking due to aftereffects of breakage of the auxiliary breakable portion 18 and consequently prevent the mounting section 17 from being separated from the front door 15. Without considering such an advantageous effect, the airbag cover 11 may be formed with no such thick portions 20.

Further, the auxiliary breakable portion 18 of the foregoing embodiment is formed by denting a top face of the mounting section 17 along and adjoining the ornament 28. This way the auxiliary breakable portion 18 will be unnoticeable and therefore conducive to improve the appearance of the airbag cover 11. More specifically, if the auxiliary breakable portion 18 is comprised of a dent formed on a back face of the mounting section 17, a sink mark may appear on the top face of the mounting section 17. Therefore, the configuration of the foregoing embodiment will improve an appearance of the airbag cover 11. Without considering such an advantageous effect, an auxiliary breakable portion 18A may be formed by denting a back face of a mounting section 17A, as shown in an airbag cover 11A in FIG. 9. The adjacency of the auxiliary breakable portion to the ornament is also optional. The auxiliary breakable portion may also be located in an area ahead of and away from the mounting section.

Figure 9:
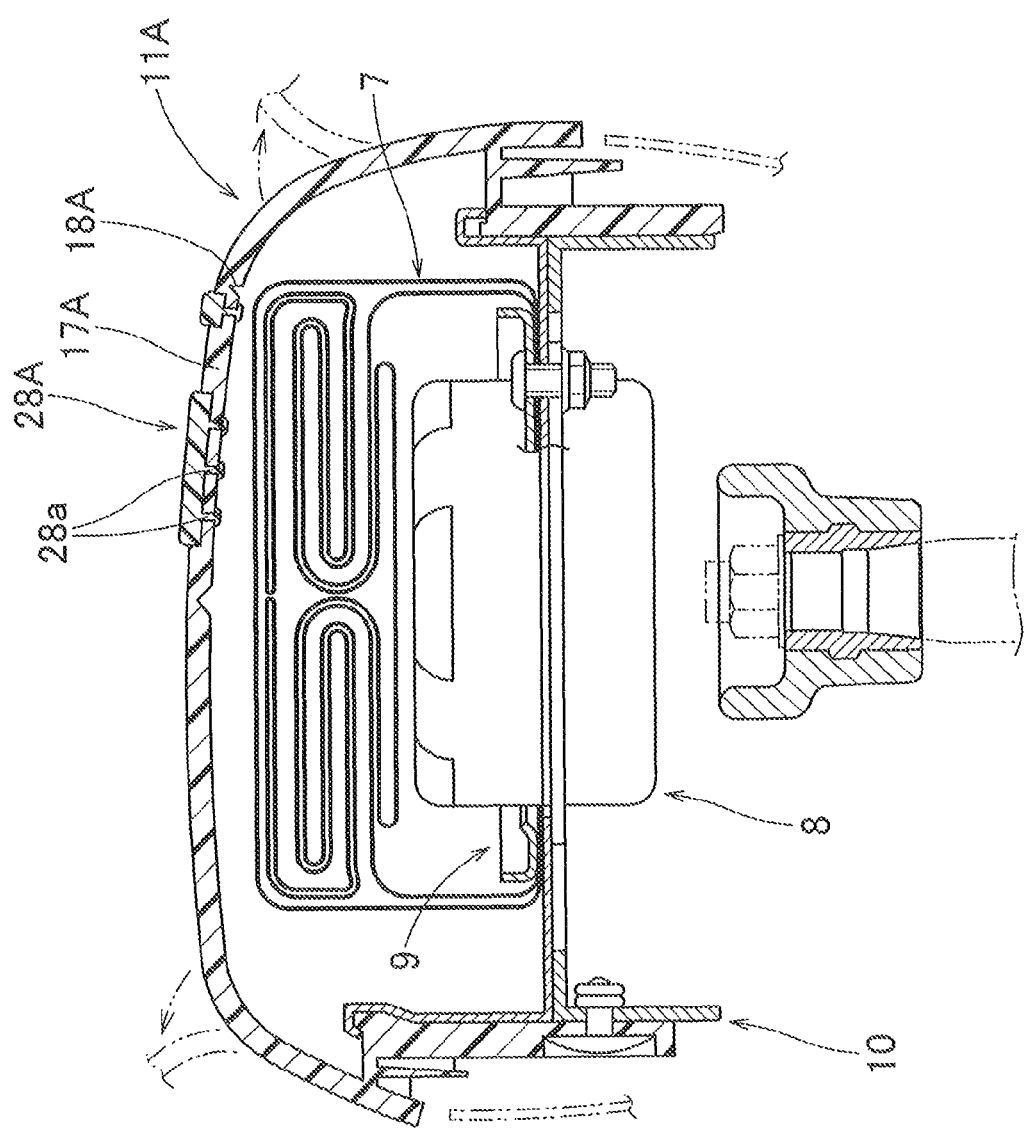
FIG. 9 is a schematic sectional view of an alternative embodiment of the invention.

In the foregoing embodiment, the ornament 28 is mounted on and integrated with the mounting section 17 of the front door 15 by film insert molding at manufacturing of the airbag cover 11. However, the ornament applicable to the present invention should not be limited thereby. The ornament may also be configured mountable on a mounting section 17A of an existing airbag cover. By way of example, an ornament 28A shown in FIG. 9 is prepared separate from an airbag cover 11A, and includes on the underside numerous mounting legs 28a projecting downward to be inserted through slots (reference numeral omitted) formed on the mounting section 17A. If leading ends of the mounting legs 28a are caulked to the back face of the mounting section 17A, the ornament 28A will be mounted on the mounting section 17A. As described above, the auxiliary breakable portion 18A of the airbag cover 11A is comprised of a notch formed on the back face of the front door 15A.

Although the airbag cover 11 of the foregoing embodiment includes two of the doors 15 and 22 which are respectively openable forward and rearward, the number of the doors formed on the ceiling wall 12 should not be limited thereby. The present invention is also applicable to such an airbag cover that includes three doors; a front door which is located at a generally front half of an area for covering an airbag and includes a mounting section, and two doors which are located at a rear half of the area for covering the airbag and openable leftward and rightward.

What is claimed is:

1. An airbag cover made from synthetic resin for covering a folded-up airbag of an airbag apparatus for a steering wheel, the airbag cover comprising:
   a door section that is openable when pushed by the airbag at deployment, the door section including at least two doors;
   a front door that is located in a front area of the airbag cover covering the airbag as a part of the door section and openable forward;
   an ornament located on a top face of the front door;
   a first hinge that is located at a front edge of the front door so as to allow the front door to open there around such that a rear edge of the front door turns forward;
   a mounting section for mounting the ornament thereon, the mounting section being located generally at a center in a left and right direction of the rear edge of the front door and partially protruding rearward from the rear edge of the front door;
   a breakable portion that is located at the rear edge of the front door and extends generally in a left and right direction in such a manner as to circumvent the mounting section;
   an auxiliary breakable portion that is located at a front edge of the mounting section and extends generally along the ornament, the auxiliary breakable portion being thinner than the front door and breakable when an obstacle contacts with the ornament during opening of the front door; and
   a pair of second hinges located at left and right ends of the auxiliary breakable portion and between the auxiliary breakable portion and the breakable portion, whereby allowing the mounting section to bend about the second hinges relative to the front door in an opposite direction to an opening direction of the front door at breakage of the auxiliary breakable portion.

2. The airbag cover as in claim 1, further comprising in a vicinity of a border of the auxiliary breakable portion and the second hinges a pair of thick portions that are thicker than the second hinges.

3. The airbag cover as in claim 1 wherein the auxiliary breakable portion is formed by denting a top face of the mounting section along and adjoining the ornament.

4. The airbag cover as in claim 3, wherein:
   the ornament is mounted on and integrated with the mounting section of the front door by film insert molding at manufacturing of the airbag cover; and
   the ornament protrudes partially from a top face of the front door.

5. The airbag cover as in claim 1, wherein:
   the ornament is originally prepared separate from the airbag cover so as to be mountable on the mounting section; and
   the ornament protrudes partially from a top face of the front door.

* * * * *